United States Patent
Mase et al.

(10) Patent No.: US 11,932,240 B2
(45) Date of Patent: Mar. 19, 2024

(54) DRIVING ASSISTANCE APPARATUS

(71) Applicant: TOYOTA JIDOSHA KABUSHIKI KAISHA, Toyota (JP)

(72) Inventors: Yusuke Mase, Nagoya (JP); Hideyuki Usui, Inazawa (JP); Masakatsu Onitsuka, Nisshin (JP); Yoshiaki Moriya, Susono (JP); Jiro Ohachi, Shizuoka-ken (JP); Yuki Tomiku, Susono (JP); Tetsuhiro Narita, Toyota (JP); Yuji Misumi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 230 days.

(21) Appl. No.: 17/065,601

(22) Filed: Oct. 8, 2020

(65) Prior Publication Data

US 2021/0221364 A1 Jul. 22, 2021

(30) Foreign Application Priority Data

Jan. 20, 2020 (JP) .................... 2020-006486

(51) Int. Cl.
*B60W 30/09* (2012.01)
*B60W 10/06* (2006.01)
(Continued)

(52) U.S. Cl.
CPC ............ *B60W 30/09* (2013.01); *B60W 10/06* (2013.01); *B60W 10/08* (2013.01); *B60W 10/18* (2013.01);
(Continued)

(58) Field of Classification Search
CPC ...... B60W 30/09; B60W 10/06; B60W 10/08; B60W 10/18; B60W 30/0956;
(Continued)

(56) References Cited

U.S. PATENT DOCUMENTS

| 2004/0193374 A1* | 9/2004 | Hac ........................ G08G 1/166 |
| | | 701/301 |
| 2006/0069509 A1* | 3/2006 | Hayasaka ......... B60R 21/01542 |
| | | 340/436 |

(Continued)

FOREIGN PATENT DOCUMENTS

| JP | 2008-123449 A | 5/2008 |
| JP | 2013-082298 A | 5/2013 |

(Continued)

OTHER PUBLICATIONS

Low-Impact Collisions What They Are and What They Mean (Year: 2019).*

*Primary Examiner* — Fadey S. Jabr
*Assistant Examiner* — Faris Asim Shaikh
(74) *Attorney, Agent, or Firm* — Dickinson Wright, PLLC (57) ABSTRACT

A control unit performs a lane departure suppression control when a host vehicle is about to depart from a traveling lane. The control unit determines whether a low impact collision has occurred. The control unit performs a secondary collision damage mitigation control when the low impact collision is determined to have occurred while the lane departure suppression control is being performed.

5 Claims, 6 Drawing Sheets

(51) Int. Cl.
*B60W 10/08* (2006.01)
*B60W 10/18* (2012.01)
*B60W 30/095* (2012.01)
*B60W 30/18* (2012.01)
*B60W 50/14* (2020.01)

(52) U.S. Cl.
CPC .. *B60W 30/0956* (2013.01); *B60W 30/18163* (2013.01); *B60W 50/14* (2013.01); *B60W 2510/30* (2013.01); *B60W 2530/00* (2013.01); *B60W 2554/404* (2020.02)

(58) Field of Classification Search
CPC .......... B60W 30/18163; B60W 50/14; B60W 2510/30; B60W 2530/00; B60W 2554/404; B60W 30/12; B60W 50/12; B60W 30/085; B60W 30/08; B60W 2030/082; B60W 30/14; B60W 30/143; B60W 30/16; B60W 30/162; B60W 30/10; B60W 2554/00; B60W 2520/10; B60W 2720/10; B60W 2050/143; B60W 2050/146; B60W 2420/42; B60W 40/105; B60W 30/0953; B60W 2420/52; B60W 2050/0071; B60W 60/0027; B60W 50/0098; B60W 2510/18; B60W 30/146; B60W 30/18127; B60W 2520/04; B60W 2520/14; B60W 2710/20; B60W 2554/4042; B60W 30/181; B60W 2720/103; B60W 2554/804; B60W 2540/18; B60W 2710/18; B60W 2520/105; B60W 2554/801; B60W 2554/802; B60W 10/20; B60W 10/04; B60W 2754/30; B60W 30/095; B60W 40/10; B60W 2420/40; B60W 2720/106; B60W 50/0097; B60Q 9/008; B60Q 5/006; B60T 7/12; B60T 7/22; B60T 2201/024; B60T 8/172; B60T 2210/32; B60T 8/171; B60T 17/22; B60T 13/662; B60T 8/58; B60T 2201/02; B60T 2250/04; B60T 8/17; B60T 2270/30; B60T 8/17558; B60T 8/32; B60T 1/14; B60T 13/268; B60T 2260/02; B60T 7/00; B60T 8/1755; B60T 8/4809; G01S 2013/93185; G01S 13/93; G01S 13/931; G01S 2013/9314; G01S 2013/9317; G01S 2013/9318; G01S 2013/9321; G01S 2013/9319; G08G 1/166; G08G 1/16; G06V 20/58; G06V 20/584; G06V 40/10; G06V 20/588; G06V 20/56; G06V 10/764; G06V 2201/07; G06V 40/168; G06V 10/25; G06V 40/20; B60R 21/0134; B60R 2021/01311; B60R 2021/01313; B60R 2021/01322; B60R 21/0136; B60R 2021/0006; B60R 2021/0009; B60R 2021/0004; B60R 2021/0002; B60R 2021/0011; B60R 2021/0023

See application file for complete search history.

(56) References Cited

U.S. PATENT DOCUMENTS

| | | | |
|---|---|---|---|
| 2008/0269991 A1* | 10/2008 | Yamashita | B60R 21/0132 701/45 |
| 2014/0039763 A1 | 2/2014 | Fujita et al. | |
| 2014/0316668 A1* | 10/2014 | Akiyama | B60W 10/20 701/70 |
| 2015/0066241 A1* | 3/2015 | Akiyama | B60W 30/09 701/1 |
| 2015/0291158 A1* | 10/2015 | Okita | B62D 15/0265 701/1 |
| 2015/0291216 A1* | 10/2015 | Sato | B60W 30/0956 701/41 |
| 2015/0360655 A1* | 12/2015 | Odate | B60W 10/18 701/70 |
| 2016/0221574 A1* | 8/2016 | Ikuta | B60W 30/08 |
| 2016/0332622 A1* | 11/2016 | Shiraishi | B60K 28/14 |
| 2017/0001637 A1* | 1/2017 | Nguyen Van | G01S 13/87 |
| 2017/0015315 A1* | 1/2017 | Hattori | B60R 21/0132 |
| 2017/0057498 A1* | 3/2017 | Katoh | B60W 30/0956 |
| 2017/0151937 A1* | 6/2017 | Inomata | B60T 7/22 |
| 2018/0102055 A1* | 4/2018 | Lim | G06V 10/75 |
| 2018/0165527 A1* | 6/2018 | Park | G08G 1/166 |
| 2018/0286242 A1* | 10/2018 | Talamonti | B62D 15/025 |
| 2018/0297545 A1* | 10/2018 | Yamaguchi | G07C 5/085 |
| 2019/0031190 A1* | 1/2019 | Choi | B60W 10/10 |
| 2019/0135276 A1* | 5/2019 | Lee | B60W 10/20 |
| 2019/0225212 A1* | 7/2019 | Buerkle | B60W 30/0956 |
| 2019/0291728 A1* | 9/2019 | Shalev-Shwartz | B60W 30/18154 |
| 2020/0001839 A1* | 1/2020 | Lee | B60T 8/17558 |
| 2020/0027341 A1* | 1/2020 | Drews | G08G 1/0133 |
| 2020/0079386 A1* | 3/2020 | Kim | B60W 10/30 |
| 2020/0079394 A1* | 3/2020 | Masuda | G08G 1/16 |
| 2020/0139963 A1* | 5/2020 | Kim | B60W 30/0953 |
| 2021/0101589 A1* | 4/2021 | Jeon | B60W 60/007 |
| 2021/0188257 A1* | 6/2021 | Zhu | B60T 8/171 |
| 2021/0221364 A1* | 7/2021 | Mase | B60W 30/12 |
| 2022/0153304 A1* | 5/2022 | Kanzler | B60W 30/095 |

FOREIGN PATENT DOCUMENTS

| | | |
|---|---|---|
| JP | 2013-233930 A | 11/2013 |
| JP | 2016002868 A | 1/2016 |
| JP | 2016-117319 A | 6/2016 |

* cited by examiner

DRIVING ASSISTANCE APPARATUS

TECHNICAL FIELD

The present disclosure relates to a driving assistance apparatus configured to perform a secondary collision damage mitigation/reduction control when a low impact collision of a host vehicle is detected.

BACKGROUND

There has been a known apparatus configured to automatically apply brakes when an air bag is inflated due to a detection of a collision of a host vehicle with a first object, so as to mitigate or avoid the secondary collision damage. The secondary collision is another collision of the host vehicle with a second object that is different from the first object. The secondary collision occurs due to a movement of the host vehicle after the collision with the first object.

Another conventional vehicle control apparatus (hereinafter, referred to as a "conventional apparatus") is disclosed in Japanese Patent Application Laid-Open (kokai) No. 20162868, The conventional apparatus is configured to increase a braking force when a low impact collision that does not cause the air bag to be inflated is detected and a brake pedal operation amount is not sufficiently large.

In addition, when the low impact collision is detected, the conventional apparatus decreases a throttle valve opening degree in such a manner that the throttle valve opening degree coincides with a degree obtained by subtracting a throttle valve opening degree decreasing amount from the current throttle vale opening degree if an acceleration pedal operation is performed, so as to reduce a drive force of the vehicle (as compared to a normal driving state).

When the low impact collision has occurred, the driver may perform some driving operation in order to avoid the secondary collision or to mitigate the secondary collision damage. If a secondary collision damage mitigation control including a brake force control and/or a drive force control are carried out in such a case, the mitigation control may interfere with the driver's driving operation for avoiding the secondary collision or for mitigating the secondary collision damage. In view of this, it may not be preferable to allow the secondary collision damage mitigation control to be performed when the low impact collision that does not cause the air bag to be inflated has occurred. Nonetheless, the conventional apparatus carries out the secondary collision damage mitigation control whenever the low impact collision is detected (without requiring another condition to be satisfied for performing the secondary collision damage mitigation control). Accordingly, the conventional apparatus cannot solve the above described problem.

SUMMARY

The present disclosure has been made to cope with the problem described above. One of the objectives of the present disclosure is to provide a driving assistance apparatus that is capable of appropriately performing the secondary collision damage mitigation control when the low impact collision has occurred.

A driving assistance apparatus according to the present disclosure comprises:
- a brake device (41, 42) configured to generate a brake force applied to a host vehicle;
- a drive force generating device (51, 52) configured to generate a drive force applied to the host vehicle; and
- a control unit (10, 40, 50, 60, 70) configured to:
  - perform a lane departure suppression control so as to prevent the host vehicle from departing from a traveling lane, by at least one of giving an alert to a driver of the host vehicle and executing a steering control, when the host vehicle is determined to be about to depart from the traveling lane (refer to 11);
  - obtain a collision indicative value indicative of an impact caused by a collision of the host vehicle with an object;
  - determine that a low impact collision that does not cause an air bag of the vehicle to be inflated has occurred when the collision indicative value exceeds a threshold (refer to 12); and
  - perform a secondary collision damage mitigation control to let brake device generate the brake force or impose an limitation on the drive force generated by the drive force generating device, if the low impact collision is determined to have occurred in a period containing a duration in which the lane departure suppression control is performed (refer to 13).

In some embodiments, the driving assistance apparatus according to the present disclosure comprises:
- a lane departure suppression control section (11) configured to perform a lane departure suppression control so as to prevent the host vehicle from departing from a traveling lane, by at least one of giving an alert to a driver of the host vehicle and executing a steering control, when the host vehicle is determined to be about to depart from the traveling lane;
- a low impact collision determining section (12) configured to obtain a collision indicative value indicative of an impact caused by a collision of the host vehicle with an object and determine that a low impact collision that does not cause an air bag of the vehicle to be inflated has occurred when the collision indicative value exceeds a threshold; and
- a secondary collision damage mitigation control section (13) configured to perform a secondary collision damage mitigation control to generate a brake device or impose an limitation on the drive force, if the low impact collision is determined to have occurred in a period containing a duration in which the lane departure suppression control is performed.

The control unit includes the lane departure suppression control section that performs the lane departure suppression control, when the host vehicle is likely to depart from the traveling lane to the outside of the traveling lane. The lane departure suppression control may include alerting to the driver of the host vehicle and/or executing the steering control, so as to prevent the host vehicle from departing from the traveling lane.

The control unit includes the low impact collision determining section that obtains the collision indicative value indicative of the impact occurred/caused by a collision of the host vehicle with an object and determines that the low impact collision has occurred when a low impact collision determination condition becomes satisfied. The low impact collision determination condition may be a condition to be satisfied when the collision indicative value exceeds the threshold, wherein the air bag(s) of the host vehicle is(are) not inflated when the collision indicative value exceeds the threshold. In other words, the control unit determines whether or not the low impact collision determination condition becomes satisfied, and determines that the low impact collision has occurred when the low impact collision determination condition becomes satisfied. For example, an acceleration of a vehicle body of the host vehicle, and/or a value varying depending on the acceleration (e.g., an integrated value of the acceleration) may be employed as the collision indicative value indicative.

In a case where the low impact collision occurs while the LDA control is being performed, the driver is unlikely to notice/realize that the host vehicle has deviated from the traveling lane. In such a case, it is unlikely that the driver can perform an appropriate operation to avoid the secondary collision or to mitigate the secondary collision damage.

In view of the above, the control unit includes the secondary collision damage mitigation control section that performs the secondary collision damage mitigation control, if the low impact collision is determined to have occurred, in a period containing a duration in which the lane departure suppression control is performed (or on the condition that the lane departure suppression control has been performed). The secondary collision damage mitigation control may be a control to generate the brake device and/or impose the limitation on (suppress) the drive force.

Accordingly, on the condition that lane departure suppression control has been performed, the secondary collision damage mitigation control can be carried out for the collision having the low impact or higher. Therefore, the driving assistance apparatus can appropriately increase chances to execute the secondary collision damage mitigation control.

Furthermore, it may be sometimes difficult to accurately determine that the low impact collision has occurred, due to a road surface condition such as a rough surface of the rough road. However, even if it is mistakenly determined that the low impact collision has occurred when the low impact collision has not actually occurred, and thus, even if the secondary collision damage mitigation control is mistakenly carried out, a movement/behavior of the host vehicle caused by the secondary collision damage mitigation control can alert the driver.

In some embodiments, the control unit (or the secondary collision damage mitigation control section) may be configured to perform the secondary collision damage mitigation control, when the low impact collision is determined to have occurred while the lane departure suppression control is being performed.

In some embodiments, the control unit (or the secondary collision damage mitigation control section) may be configured to perform the secondary collision damage mitigation control, when the low impact collision is determined to have occurred in a period from an end time point at which the lane departure suppression control is finished to a time point at which a first set time elapses from the end time point.

In some embodiments, the control unit (or the secondary collision damage mitigation control section) may be configured to perform the secondary collision damage mitigation control, when the lane departure suppression control starts to be performed in a period from a start time point at which the low impact collision is determined to have occurred to a time point at which a second time elapses from the start time point.

In some embodiments, the driving assistance apparatus may further comprise a rear direction monitoring sensor (or following vehicle detecting part) (100) that is configured to detect a following vehicle that follows the host vehicle in a rear area of the host vehicle.

In this case, the control unit (or the secondary collision damage mitigation control section) may be configured to:
 perform the secondary collision damage mitigation control by letting the brake device generate the brake force (S23) when the following vehicle is not detected in a predetermined proximity area of the host vehicle (S21: No); and
 perform the secondary collision damage mitigation control by imposing a limitation on (or suppressing) the drive force without letting the brake device generate the brake force (S23), when the following vehicle is detected in the predetermined proximity area of the host vehicle (S21: Yes).

For example, in a case where an inter-vehicle between the host vehicle and a following vehicle that follows the host vehicle is short, when the brake force is generated by the secondary collision damage mitigation control, the following vehicle may excessively approach (come close to) the host vehicle. In view of this, the driving assistance apparatus in some embodiments uses the rear direction monitoring sensor to detect the following vehicle. In addition, the control unit (or the secondary collision damage mitigation control section) performs the secondary collision damage mitigation control by generating the brake force when the following vehicle is not detected in the predetermined proximity area of the host vehicle, and performs the secondary collision damage mitigation control by suppressing the drive force without generating the brake force. Therefore, the following vehicle can be prevented from approaching the host vehicle too closely.

For example, the predetermined proximity area may be an area within a set distance from the host vehicle. The set distance may preferably be set to a distance which is longer as a vehicle speed of the host vehicle is higher.

Notably, in the above description, in order to facilitate understanding of the present disclosure, the constituent elements or the like of the disclosure corresponding to those of the embodiments of the disclosure which will be described later are accompanied by parenthesized names and/or symbols which are used in the embodiments. However, the constituent elements of the disclosure are not limited to those in the embodiments defined by the names and/or the symbols.

DETAILED DESCRIPTION

A driving assistance apparatus (hereinafter, sometimes referred to as a "present apparatus") according to an embodiment of the present disclosure will be described with reference to the drawings.

Figure 1:
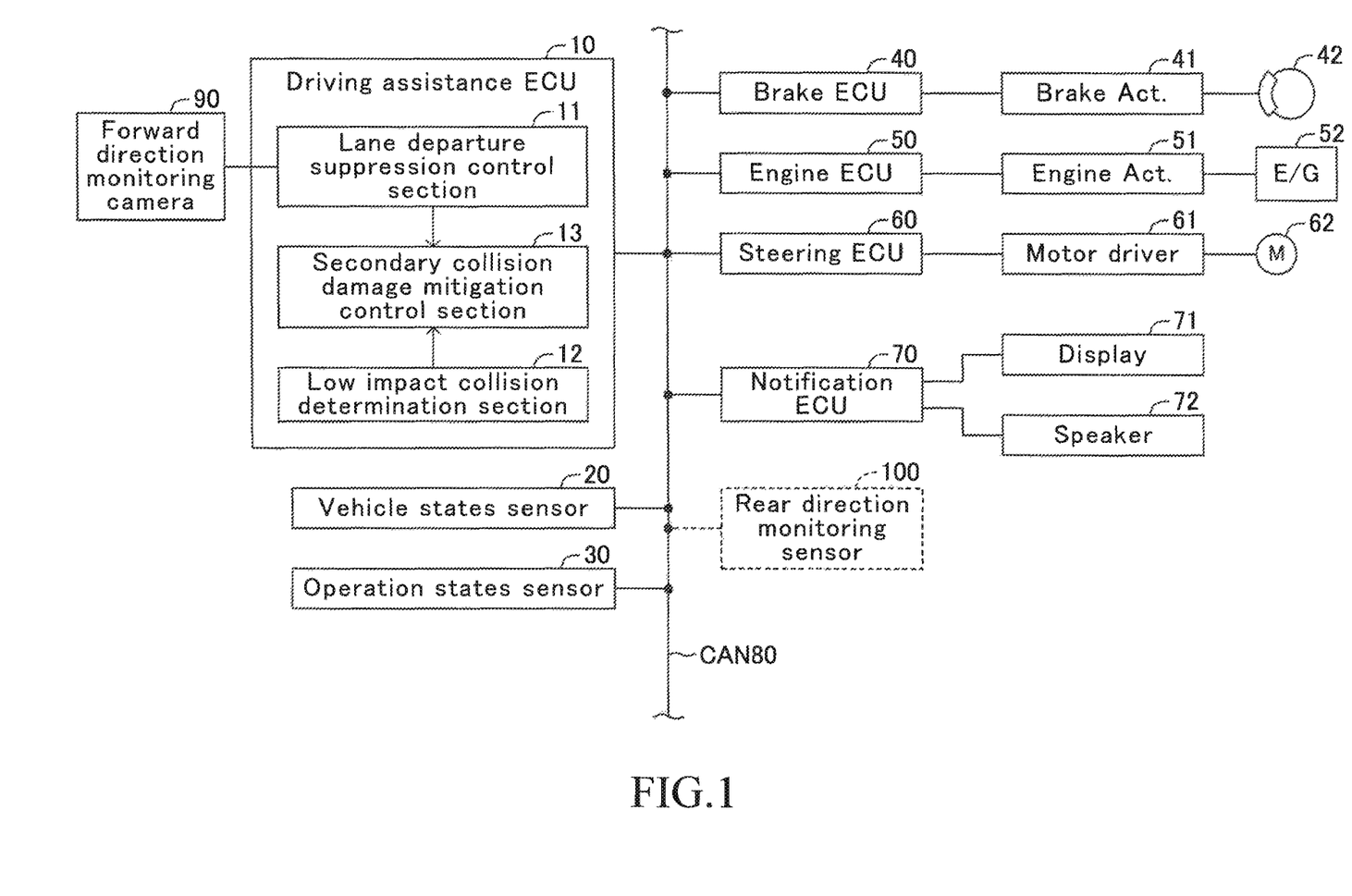
FIG. 1 is a schematic diagram of a driving assistance apparatus according to an embodiment of the present disclosure.

The present apparatus is applied to a vehicle that is sometimes referred to as a "host vehicle" in order to be distinguished from other vehicles. As shown in FIG. 1, the present apparatus comprises a driving assistance ECU 10, a vehicle states sensor 20, an operation states sensor 30, a brake ECU 40, an engine ECU 50, a steering ECU 60, and a notification ECU 70.

These ECUs are Electronic Control Units. The ECUs are connected with each other through a CAN (Controller Area Network) 80 so that each of them can transmit information to and receive information from the other any one of the ECUs. Each of the ECUs comprises, as a main component, a microcomputer that includes a CPU, a ROM, a RAM, a nonvolatile memory, and an interface I/F. The CPU achieves various functions through executing instructions (i.e., programs/routines) stored in the ROM. Some or all of those ECUs may be integrated into a single ECU.

The driving assistance ECU 10 is a main control device to perform driving assistance controls (or driver assistance controls to assist a driver of the host vehicle to drive the host vehicle) that includes a "lane departure suppression (prevention) control" described later and a "secondary collision damage mitigation control" described later. The driving assistance ECU 10 may include a plurality of ECUs (e.g., an ECU for executing the lane departure suppression control, and an ECU for executing the secondary collision damage mitigation control).

The lane departure suppression control in the present embodiment is a control for alerting the driver and performing a steering control when the host vehicle is about to depart from a traveling lane (a lane in which the host vehicle is traveling) so as to prevent the host vehicle from departing the traveling lane. It should be noted that both of the alert to the driver and the steering control are not necessarily required as the lane departure suppression control. Namely, only one of alerting the driver and performing the steering control may be executed as the lane departure suppression control.

The secondary collision damage mitigation control is a control for applying a brake force to the host vehicle when the low impact collision of the host vehicle has been detected so as to mitigate the secondary collision damage. In the present embodiment, the secondary collision damage mitigation control is carried out under the condition that the lane departure suppression control is being carried out. The low impact collision is a collision (low level collision) that does not cause the air bag of the host vehicle to be inflated. The low impact collision may said to be a collision that includes the collision that does not cause the air bag of the host vehicle to be inflated. The secondary collision is another collision of the host vehicle with a second object that is different from a first object with which the host vehicle collided firstly, and occurs due to a movement of the host vehicle after the collision with the first object.

The host vehicle in which the present apparatus is installed comprises an air bag control device and is configured to inflate the air bag(s) of the host vehicle when a collision causing a predetermined impact or an impact stronger than that is detected. The air bag control device starts applying a mitigating-secondary-collision-damage-brake-force to the host vehicle when the air bag(s) is(are) inflated. The present apparatus performs/executes (carries out) the secondary collision damage mitigation control separately from the mitigating-secondary-collision-damage-brake-force, when a specific state is detected. The specific state is a state where the low impact collision is detected while the lane departure suppression control is being executed. This can expand states where the secondary collision damage mitigation control can be executed so that secondary collision damage mitigation control can be carried out when the low impact collision has occurred.

The driving assistance ECU 10 will be described in great detail later.

The vehicle states sensor 20 is configured to detect vehicle states (running states) of the host vehicle, and includes, for example, a vehicle speed sensor configured to detect/measure a vehicle speed of the host vehicle, an acceleration sensor configured to detect an acceleration of a vehicle body of the host vehicle in a front-rear direction and an acceleration of the vehicle body of the host vehicle in a lateral (left-right) direction, and a yaw rate sensor configured to detect a yaw rate of the host vehicle. Information (signals) detected/obtained by the vehicle states sensor 20 is transmitted to each of the ECUs through the CAN 80.

The operation states sensor 30 is configured to detect driving operation states of the host vehicle performed by the driver of the host vehicle. The operation states sensor 30 includes sensors and switches. More specifically, the operation states sensor 30 includes an acceleration operation amount sensor configured to detect an operation amount of an acceleration pedal, a brake operation amount sensor configured to detect an operation amount of a brake pedal, a brake switch configured to detect presence or absence of an operation to the brake pedal, a steering angle sensor configured to detect a steering angle, a steering torque sensor configured to detect a steering torque, a turn signal switch (blinker switch) configured to detect an operating state of turn signals, and a shift position sensor configured to detect a shift lever position for a transmission. Information (signals) detected/obtained by the vehicle states sensor 20 is transmitted to each of the ECUs through the CAN 80.

The brake ECU 40 is connected to a brake actuator 41. The brake actuator 41 is configured to vary/adjust oil pressure of brake fluid applied to a friction brake mechanism 22 of each of wheels so as to generate a frictional brake force corresponding to the oil pressure. The brake ECU 40 is configured to determine a driver request deceleration (or target driver requiring deceleration) based on the operation amount of the brake pedal detected by the brake operation amount sensor, and to control the brake actuator 41 in such a manner that the host vehicle decelerates at the driver request deceleration. Furthermore, when the brake ECU 40 has received a brake instruction transmitted from the driving assistance ECU 10, the brake ECU 40 controls the brake actuator 41 in such a manner that the host vehicle decelerates at a request deceleration (or a target requiring deceleration) that is contained in the brake instruction. The brake actuator 41 and the friction brake mechanism 22 forms a brake device to apply the brake force to the host vehicle.

The engine ECU 50 is connected to an engine actuator 51. The engine actuator 51 is an actuator for changing an operation state of an internal combustion engine 52, and includes a throttle valve actuator for changing an opening degree of the throttle valve. The engine ECU 50 is configured to determine a driver requiring torque based on the operation amount of the acceleration pedal detected by the acceleration operation amount sensor and the vehicle speed detected by the vehicle speed sensor, and to control the engine actuator 51 in such a manner that the engine 52 outputs a torque equal to the driver requiring torque. The engine actuator 51 and the engine 52 form a drive force generating device to generate a drive force applied to the host vehicle. Furthermore, when the engine ECU 50 has received a driving force restriction instruction transmitted from the driving assistance ECU 10, the engine ECU 50 controls the engine actuator 51 so as to impose a limitation on the torque generated/output by the engine 52. It should be noted that the engine actuator 51 may be a driving device for an electric motor, when the host vehicle is an electric vehicle. That is, the driving device and the electric motor form the drive force generating device to generate the drive force applied to the host vehicle. When the host vehicle is a hybrid vehicle, the engine actuator 51 may include the engine actuator 51 described above and a driving device for an electric motor. That is, the engine actuator 51, the engine, the driving device, and the electric motor form the drive force generating device to generate the drive force applied to the host vehicle.

The steering ECU 60 is a controller for a well-known electric power steering system, and is connected to a motor driver 61. The motor driver 61 is connected to a steering motor 62. The steering motor 62 is incorporated in an unillustrated steering mechanism of the host vehicle. The steering motor 62 generates torque using an electric power supplied through the motor driver 61 so as to add a steering assist torque to the steering mechanism or to steer the left and right steered wheels of the host vehicle.

The notification ECU 70 is connected with a display (or a display device) 71 and a speaker 72. The notification ECU 70 can display information regarding the driving assistance controls on the display 71 in response to instructions transmitted from the driving assistance ECU 10. The notification ECU 70 can make the speaker 72 generate alert sounds (e.g., a buzzer sound, and a voice message) in response to instructions transmitted from the driving assistance ECU 10.

The driving assistance ECU 10 will next be described in detail. The driving assistance ECU 10 comprises a lane departure suppression control section 11, a low impact collision determination section 12, and a secondary collision damage mitigation control section 13, in terms of its functions.

<Lane Departure Suppression Control Section>

The lane departure suppression control section 11 is a functional part for performing the lane departure suppression control. Hereinafter, the lane departure suppression control is referred to as an "LDA (Lane Departure Alert) control", and the lane departure suppression control section 11 is referred to as an "LDA control section 11". The LDA control itself is well known, and thus, the brief description will next be made.

Figure 2:
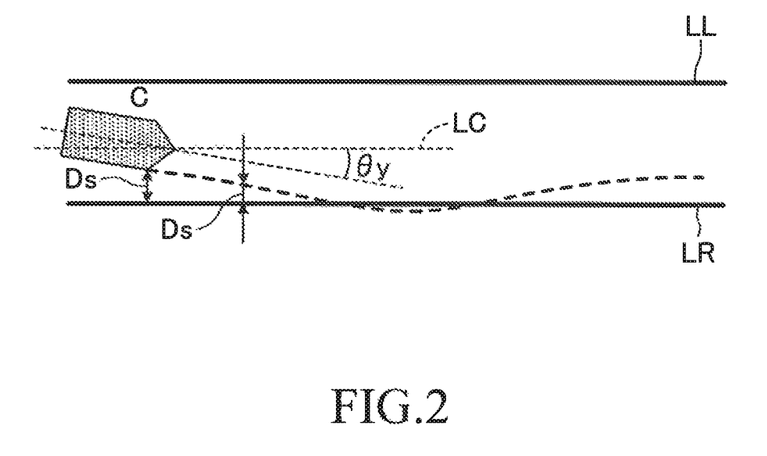
FIG. 2 is a plan view of a host vehicle for describing parameters that define a position of the host vehicle with respect to a traveling lane.

A forward direction monitoring camera (camera device) 90 is connected to the lane departure suppression control section 11. The forward direction monitoring camera 90 takes a picture of a scene in front of the host vehicle to obtain image data. The forward direction monitoring camera 90 analyzes the image data so as to recognize (extract information on) a left white line LL and a right white line LR shown in FIG. 2. The forward direction monitoring camera 90 calculates (obtains) a curve radius R of a center line LC that is at a center position between the left white line LL and the right white line LR, and calculates (obtains) a deviation angle θy formed between a direction of the center line LC and a direction of the host vehicle C. Hereinafter, the deviation angle θy is referred to as the "yaw angle θy". Furthermore, the forward direction monitoring camera 90 calculates (obtains) a right distance DsR between the front right wheel of the host vehicle C and the right white line LR in a road width direction, and a left distance DsL between the front left wheel of the host vehicle C and the left white line LL in the road width direction. Each of the right distance DsR and the left distance DsL is referred to as a "side distance Ds". FIG. 2 shows the right distance DsR as the side distance Ds. As understood, there are two side distances (namely, the right distance DsR and the left distance DsL), however, only one of them is used for calculating a control amount for the LDA control. More specifically, one of the side distances Ds, that is on the side of the direction in which the host vehicle C is likely to deviate from the traveling lane (i.e., that is on the side of the direction indicated by the yaw angle θy) is used for calculating the control amount for the LDA control.

The forward direction monitoring camera 90 transmits white line information regarding the curve radius R, the yaw angle θy, and the side distance Ds to the LDA control section 11, every time a short predetermined time elapses.

The LDA control section 11 receives (obtains) the white line information (R, θy, Ds) from the forward direction monitoring camera 90, and then, calculates (obtains) a target steered wheel angle θLDA* that is the control amount for the LDA control, every time a predetermined time elapses. The target steered wheel angle θLDA* is a steered wheel angle that can prevent the host vehicle from deviating from the traveling lane (to outside of the white lines), and is calculated according to the following equation (1).

$$\theta LDA^* = K1 \times v + K2 \times \theta y + K3 \times Ds' \qquad (1)$$

In the equation (1), K1, K2, and K3 are respective control gains, v is a curvature of the traveling lane (v=1/R), and Ds' is a value corresponding to the side distance Ds used for calculating the control amount for the LDA control. The value of Ds' is set so as to be larger as the side distance Ds used for calculating the control amount for the LDA control is smaller.

The LDA control section 11 starts calculating the target steered wheel angle θLDA* when a predetermined LDA start condition becomes satisfied, and transmits an instruction signal containing the target steered wheel angle θLDA* to the steering ECU 60. The predetermined LDA start condition is a condition to be satisfied when it is determined that the host vehicle becomes highly likely to (about to) deviate from the traveling lane. For example, the predetermined LDA start condition becomes satisfied, when the side distance Ds used for calculating the control amount for the LDA control becomes shorter than an LDA start distance threshold, or when a time length between the present time point to a time point at which the host vehicle will deviate from the traveling lane becomes shorter than an LDA start time threshold.

The LDA control section 11 finishes/stops calculating the target steered wheel angle θLDA* when a predetermined LDA end condition becomes satisfied, and stop transmitting the instruction signal containing the target steered wheel angle θLDA* to the steering ECU 60. The predetermined LDA end condition is a condition to be satisfied when it is determined that the host vehicle becomes highly unlikely to deviate from the traveling lane. For example, the predetermined LDA end condition becomes satisfied, when the side distance Ds used for calculating the control amount for the LDA control becomes longer than an LDA end distance threshold, or when a lane change operation of the host vehicle to an adjacent lane is detected.

It should be noted that the LDA control section 11 does not transmit the instruction signal containing the target steered wheel angle θLDA* to the steering ECU 60, while the turn signal lamps that correspond to the deviation direction are being intermittently turned on.

The steering ECU 60 drives the steering motor 62 in such a manner that the actual steered wheel angle follows (becomes equal to) the target steered wheel angle θLDA* while the steering ECU 60 receives the instruction signal containing the target steered wheel angle θLDA*. By the steering control described above, the deviation of the host vehicle from the traveling lane is prevented (suppressed).

In parallel with the steering control (that makes the actual steered wheel angle follow the target steered wheel angle θLDA*) described above, the LDA control section 11 transmits the instruction (i.e., an alert instruction) to the notification ECU 70. While the notification ECU 70 receives the alert instruction from the LDA control section 11, the notification ECU 70 lets the speaker 72 generate the alert buzzer sounds (sound for the driver attention alert) and lets the display 71 display the alert. By the alert to the driver described above, the deviation of the host vehicle from the traveling lane is prevented (suppressed).

It should be noted that a start timing of the alert to the driver is not necessarily the same as a start timing of the above described steering control, and may be earlier than the start timing of the above described steering control. It should also be noted that a finish timing of the alert to the driver is not necessarily the same as a finish timing of the above described steering control.

While the LDA control section 11 is executing the LDA control (namely, while the LDA control section 11 is executing at least one of the above described steering control and the above described alert to the driver), the LDA control 11 continues transmitting an "LDA control executing signal indicating that the LDA control is being executed" to the secondary collision damage mitigation control section 13.

<Low Impact Collision Determination Section>

The low impact collision determination section 12 is a functional part for determining whether or not the low impact collision has occurred. The low impact collision determination section 12 has stored a predetermined low impact collision determination condition, and determines that the low impact collision has occurred when the low impact collision determination condition becomes satisfied. When the low impact collision determination section 12 determines that the low impact collision has occurred (i.e., when the low impact collision is detected), the low impact collision determination section 12 transmits a "low impact collision detection signal indicating that the low impact collision has occurred" to the secondary collision damage mitigation control section 13.

The low impact collision determination condition is determined to become satisfied when both of the following determination conditions B1 and B2 are satisfied.

Determination condition B1: This condition B1 is satisfied when an acceleration (a magnitude of an acceleration) of a vehicle body of the host vehicle is greater than an acceleration threshold.

Determination condition B2: This condition B2 is satisfied when an integrated value of the acceleration (the magnitude of the acceleration) of the vehicle body of the host vehicle is greater than an integrated value threshold.

The acceleration (the magnitude of the acceleration) of the vehicle body used in the above conditions is obtained/calculated based on "the acceleration of the vehicle body in the front-rear direction and the acceleration of the vehicle body in the left-right direction" detected by the acceleration sensor. The acceleration of the vehicle body in the front-rear direction is referred to as a "front-rear acceleration Gx", and the acceleration of the vehicle body in the left-right direction is referred to as a "left-right acceleration Gy". Each of the acceleration of the vehicle body and the integrated value of the acceleration of the vehicle body are used as a collision indicative value indicative of a degree of a collision of the host vehicle.

It should be noted that the acceleration detected by the acceleration sensor includes a deceleration (i.e., a negative acceleration). The low impact collision determination section 12 performs the calculations with discriminating between a case where the acceleration (Gx, or Gy) detected by the acceleration sensor is positive and a case where the acceleration (Gx, or Gy) detected by the acceleration sensor is negative. Furthermore, the left-right acceleration Gy is defined so as to be positive when a direction of the left-right acceleration Gy is one (e.g., the left direction) of the left directions and the right direction, and so as to be negative when the direction of the left-right acceleration Gy is the other (e.g., the right direction) of the left directions and the right direction. In the present specification, when discussing a magnitude of the left-right acceleration Gy that is negative, an absolute value of the left-right acceleration Gy is used for a comparison with a threshold.

In the present example, the low impact collision determination section 12 determines whether or not the low impact collision has occurred at a front part of the host vehicle, and determines whether or not a low impact collision has occurred at a side part of the host vehicle. Hereinafter, the low impact collision that occurs at the front part of the host vehicle is sometimes referred to as a "front collision", and the low impact collision that occurs at the side part of the host vehicle is sometimes referred to as a "side collision". The low impact collision determination section 12 determines that the low impact collision determination condition becomes satisfied, when one of a collision determination condition for the front collision and a collision determination condition for the side collision becomes satisfied.

The collision determination condition for the front collision becomes satisfied when both of a determination condition B1a (as the condition B1) described below and a determination condition B2a (as the condition B2) described below are satisfied.

The determination condition B1a is satisfied when the magnitude/absolute value of the front-rear acceleration Gx (that is negative in this case) of the vehicle body is greater than an acceleration threshold Gxth for the front collision determination.

The determination condition B2a is satisfied when the integrated value Vx of the front-rear acceleration Gx of the vehicle body is greater than an integrated value threshold Vxth for the front collision determination.

The collision determination condition for the side collision becomes satisfied, when both of a determination condition B1b (as the condition B1) described below and a determination condition B2b (as the condition B2) described below are satisfied.

The determination condition B1b is satisfied when (a magnitude of) the left direction acceleration Gyl (that is the left-right acceleration Gy toward left) of the vehicle body is greater than an acceleration threshold Gylth for the left side collision determination.

The determination condition B2b is satisfied when the integrated value Vyl of the left direction acceleration Gyl of the vehicle body is greater than an integrated value threshold Vylth for the left side collision determination.

The collision determination condition for the side collision also becomes satisfied, when both of a determination condition B1c (as the condition B1) described below and a determination condition B2c (as the condition B2) described below are satisfied.

The determination condition B1 c is satisfied when (a magnitude of) the right direction acceleration Gyr (that is the left-right acceleration Gy toward right) of the vehicle body is greater than an acceleration threshold Gyrth for the right side collision determination, The determination condition B2c is satisfied when the integrated value Vyr of the right direction acceleration Gyr of the vehicle body is greater than an integrated value threshold Vyrth for the right side collision determination.

The above integrated value of the acceleration (i.e., any one of the integrated value Vx, the integrated value Vyl, and the integrated value Vyr) is an integrated value of one of respective accelerations (or decelerations) for a period from a start time point (start timing of the integration) described below to an end time point (end timing of the integration) described below.

The start time point (start timing of the integration) is a first start timing described below or a second start timing described below, whichever comes first.

The first start timing is a timing at which an interval integrated value of the front-rear acceleration Gx (that is an integrated value of the front-rear acceleration Gx for a predetermined set time window) exceeds a front-rear interval integrated value threshold.

The second start timing is a timing at which an interval integrated value of the left-right acceleration Gy (that is an integrated value of the left-right acceleration Gy for a predetermined set time window) exceeds a left-right interval integrated value threshold.

The end time point (end timing of the integration) is a first end timing described below or a second end timing described below, whichever comes first.

The first end timing is a timing at which a first predetermined set time elapses after a "resultant interval integrated value of the interval integrated value of the front-rear acceleration Gx and the interval integrated value of the left-right acceleration Gy" becomes lower than a resultant interval integrated value threshold.

The second end timing is a timing at which a second predetermined set time (that is longer than the first predetermined set time) elapses after the start time point (start timing of the integration).

The low impact collision determination section 12 repeatedly calculates the above interval integrated values every time a predetermined interval elapses, so as to detect the start time point (start timing of the integration) and the end time point (end timing of the integration).

The acceleration thresholds (i.e., the acceleration threshold Gxth, the acceleration threshold Gylth, and the acceleration threshold Gyrth) and the integrated value thresholds (i.e., the integrated value threshold Vxth, the integrated value threshold Vylth, and the integrated value threshold Vyrth) are set such that the collision determination condition for the front collision or the collision determination condition for the side collision becomes satisfied earlier than a timing at which the air bag control apparatus starts to inflate the air bag(s). In other words, the low impact collision is detected for a collision that does not cause the air bag(s) to be inflated.

For example, when the host vehicle is running on a rough road, the magnitude of one of the accelerations of Gx, Gyl, and Gyr may temporarily and/or momentarily exceed the respective thresholds (Gxth, Gylth, Gyrth). Thus, if it is determined that the low impact collision has occurred when only one of the conditions of the determination conditions B1a, B1b, and B1c is satisfied, such a determination may be incorrect. This is because, it is difficult to discriminate between the case where the low impact collision has occurred and the case where the host vehicle is running on the rough road, using only one of the conditions of the determination conditions B1a, B1b, and B1c.

Whereas, one of the integrated values of Vx, Vyl, and Vyr of when the low impact collision has occurred becomes larger than respective integrated values of when the host vehicle is running on the rough road. In view of this, in the present embodiment, the determination conditions B2a, B2b, and B2c are further determined to detect the low impact collision. Accordingly, a possibility that it is mistakenly determined that the low impact collision has occurred can be reduced while the host vehicle is running on the rough road.

It should be noted that, although the low impact collision to be determined to have occurred includes the front collision and the side collision in the present embodiment, however, it may include a low impact collision that occurs at a rear part of the host vehicle. The low impact collision that occurs at the rear part of the host vehicle is sometimes referred to as a "rear collision".

A collision determination condition for the rear collision becomes satisfied, when both of a determination condition B1d (as the condition B1) described below and a determination condition B2d (as the condition B2) described below are satisfied.

The determination condition B1d is satisfied when the magnitude/absolute value of the front-rear acceleration Gx (that is positive in this case) of the vehicle body is greater than an acceleration threshold Gxth for the rear collision determination.

The determination condition B2d is satisfied when the integrated value Vx of the front-rear acceleration Gx (that is positive in this case) of the vehicle body is greater than an integrated value threshold Vxth for the rear collision determination.

In this configuration, the low impact collision determination section 12 determines that the low impact collision determination condition becomes satisfied, when one of the collision determination condition for the front collision, the collision determination condition for the side collision (the left side collision or the right side collision), and the collision determination condition for the rear collision.

<Secondary Collision Damage Mitigation Control Section>

The secondary collision damage mitigation control section 13 is a functional part for performing (carrying out) the secondary collision damage mitigation control for applying the brake force to the host vehicle and suppressing (decreasing) the drive force of the host vehicle so as to mitigate the secondary collision damage of the host vehicle. Hereinafter, the secondary collision damage mitigation control section 13 is referred to as the "SC damage mitigation control section 13" or the "SCDMC section 13". "SC" is an abbreviation of "secondary or second collision".

The SCDMC section 13 is configured to (has a function to) determine, based on the LDA control executing signal transmitted/supplied from the LDA control section 11 and the low impact collision detection signal transmitted/supplied from the low impact collision determination section 12, whether to perform the secondary collision damage mitigation control, that is, hereinafter, referred to as the "SC damage mitigation control".

Figure 3:
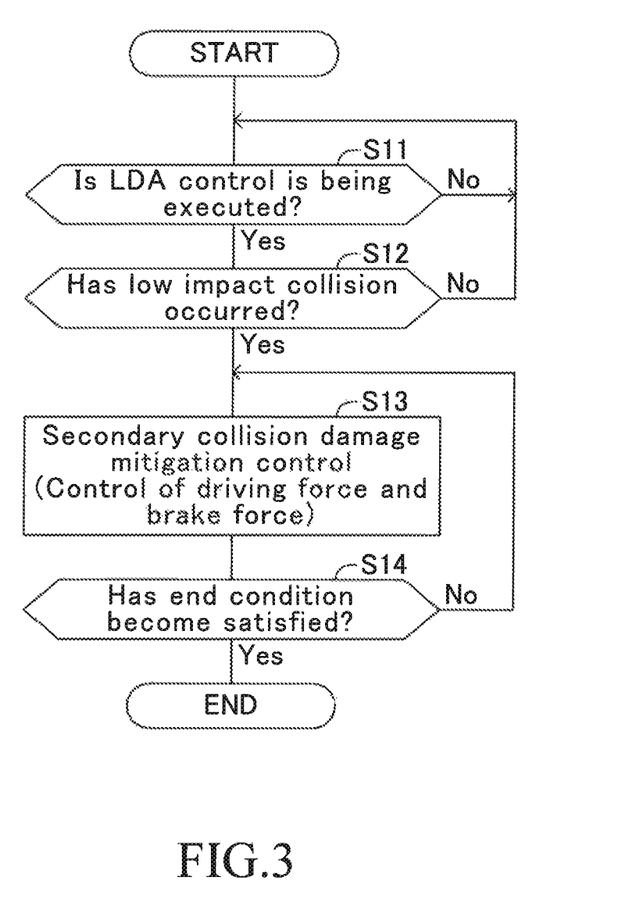
FIG. 3 is a flowchart representing a secondary collision damage mitigation control routine.

FIG. 3 shows an SC damage mitigation control routine executed by the SCDMC section 13. The SCDMC section 13 starts executing the SC damage mitigation control routine when an initialization process is finished after an ignition switch is turned on.

After the SCDMC section 13 starts executing the SC damage mitigation control routine, it firstly determines whether or not the LDA control is being executed at step S11. More specifically, the SCDMC section 13 determines whether or not the LDA control executing signal is being supplied from the LDA control section 11.

When the SCDMC section 13 determines that the LDA control is not being executed, the SCDMC section 13 repeats the process of step S11 at a short interval. When the LDA control executing signal is supplied from the LDA control section 11 to the SCDMC section 13 while the SCDMC section 13 repeats the process of step S11, the SCDMC section 13 makes a "Yes" determination at step S11 so as to proceed to step S12.

At step S12, the SCDMC section 13 determines whether or not the low impact collision has occurred. More specifically, the SCDMC section 13 determines whether or not the low impact collision detection signal has been supplied from the low impact collision determination section 12. The low impact collision detection signal is supplied from the low impact collision determination section 12 to the SCDMC section 13, when the low impact collision determination condition (B1a and B2a, B1b and B2b, B1c and B2c, B1d and B2d) becomes satisfied (or is determined to become satisfied).

When the SCDMC section 13 determines that the low impact collision has not occurred, the SCDMC section 13 returns to step S11. Thus, the SCDMC section 13 repeats the process of step S12 as long as it is determined that the LDA control is being executed.

When the SCDMC section 13 makes a "Yes" determination at step S12 while the above processes are being repeated (namely, when it is determined that the low impact collision has occurred while the LDA control is being executed), the SCDMC section 13 proceeds to step S13 so as to perform the SC damage mitigation control. More specifically, the SCDMC section 13 transmits an SC damage mitigation control instruction to the brake ECU 40. The SC damage mitigation control instruction includes information on a predetermined request deceleration (or a target requiring deceleration) for the SC damage mitigation. When the brake ECU 40 has received the SC damage mitigation control instruction, the brake ECU 40 controls the brake actuator 41 in such a manner that the host vehicle decelerates at the request deceleration for the SC damage mitigation. This can generate the frictional brake force to each of the wheels without requiring the driver's brake pedal operation so as to forcibly decelerate the host vehicle.

While the SCDMC section 13 performs the SC damage mitigation control, the SCDMC section 13 transmits a driving force restriction instruction to the engine ECU 50 so as to impose a limitation on the torque generated/output by the engine 52 (e.g., so as to set the torque generated by the engine 52 to zero or a torque necessary for creeping). The engine ECU 50 controls the engine actuator 51 so as to impose a limitation on the torque generated by the engine 52 according to the driving force restriction instruction. Therefore, even if the driver presses the acceleration pedal, the driver requiring torque is ignored, and thus, the host vehicle does not perform acceleration movement in accordance with the acceleration pedal operation.

Subsequently, at step S14, the SCDMC section 13 determines whether or not an end condition of the SC damage mitigation control becomes satisfied. The SCDMC section 13 determines that the end condition of the SC damage mitigation control becomes satisfied, when at least one of the following determination conditions C1, C2, C3, and C4 becomes satisfied.

The determination condition C1 is satisfied when releasing the acceleration pedal is detected.

The determination condition C2 is satisfied when a brake pedal operation is detected (i.e., the brake pedal is operated).

The determination condition C3 is satisfied when a steering operation is detected (i.e., the steering wheel is operated).

The determination condition C4 is satisfied when the stop of the host vehicle is detected (i.e., the host vehicle has stopped).

For instance, the determination condition C1 becomes satisfied when the releasing operation of the acceleration pedal is detected through the acceleration operation amount sensor. For instance, the determination condition C2 becomes satisfied when the operation amount of the brake pedal that is greater than a threshold is detected through the brake operation amount sensor. For instance, the determination condition C3 becomes satisfied when a steering rate that is greater than a threshold is detected through the steering angle sensor. For instance, the determination condition C4 becomes satisfied when it is determined that the vehicle speed is zero or is smaller than or equal to a vehicle speed threshold that is in the vicinity of zero, using the vehicle speed sensor.

It should be noted that the end condition of the SC damage mitigation control is not limited to the above described condition. For example, the end condition of the SC damage mitigation control may include only one of the above determination conditions C1-C4. In addition, as described, the determination condition C1 may be satisfied only when the releasing operation of the acceleration pedal is detected (but not be satisfied when the pressing operation to the acceleration pedal is detected).

Unless the end condition of the SC damage mitigation control becomes satisfied (S14: No), the SCDMC section 13 goes back to step S13, so that the SC damage mitigation control continues being performed.

When the end condition of the SC damage mitigation control becomes satisfied (S14: Yes), the SCDMC section 13 finishes the SC damage mitigation control routine.

In a case where the low impact collision occurs while the LDA control is being performed, the driver is unlikely to notice/realize that the host vehicle has deviated from the traveling lane. In such a case, it is highly unlikely that the driver performs an appropriate operation to avoid the secondary collision or to mitigate the secondary collision damage. Therefore, it is preferable that the SC damage mitigation control be performed for not only a collision that causes the air bag(s) to be inflated but also for the low impact collision that does not cause the air bag(s) to be inflated in such a case.

In view of the above, the present embodiment performs the SC damage mitigation control when the low impact collision is detected, while (on the condition/premise that) the LDA control is being executed. Thus, when the host vehicle deviates from the traveling lane and collides with the obstacle, the SC damage mitigation control is carried out so as to mitigate the secondary collision damage.

Furthermore, it may be sometimes difficult to accurately determine that the low impact collision has occurred, due to a road surface condition such as a rough surface of the rough road. However, even if it is determined that the low impact collision has occurred when the low impact collision has not actually occurred, and thus, the SC damage mitigation control is carried out, a movement/behavior of the host vehicle caused by the SC damage mitigation control can alert the driver.

As has been described, the present embodiment can broaden cases (chances) where the SC damage mitigation control is carried out to the low impact collision. In other words, the present embodiment can carry out the SC damage mitigation control appropriately at an early timing that is before the air bag(s) starts to be inflated.

First Modified Embodiment

Figure 4:
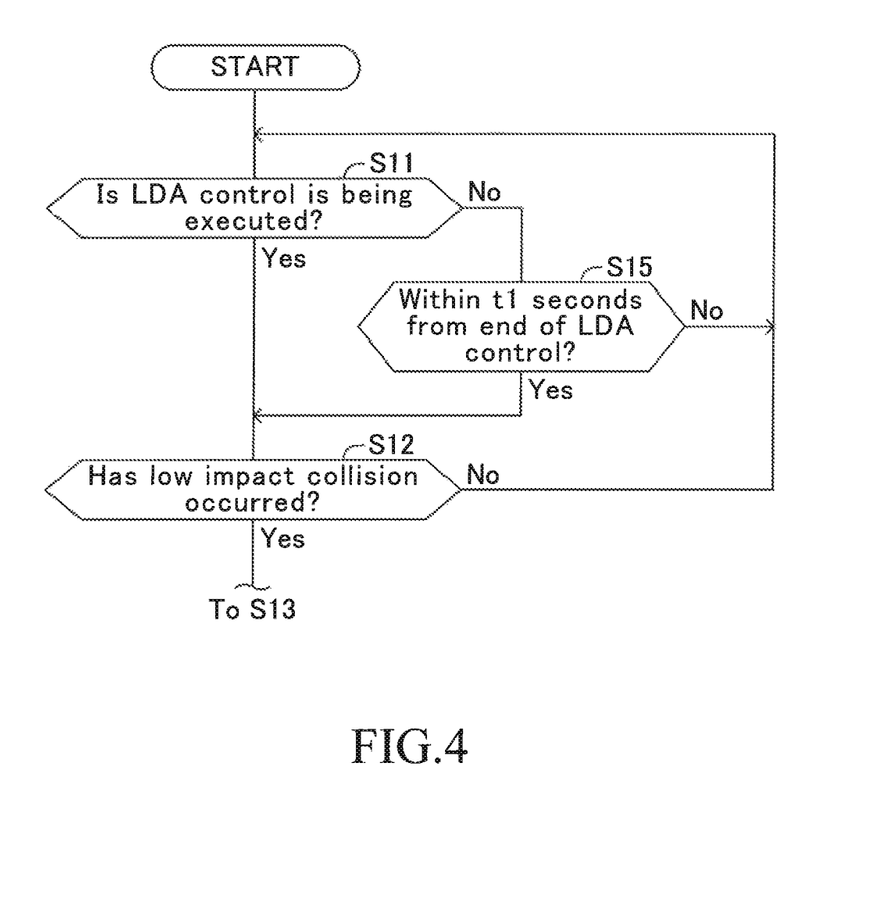
FIG. 4 is a part of a flowchart representing a secondary collision damage mitigation control routine of a first modified embodiment.

In the present embodiment described above, the SC damage mitigation control is carried out when the low impact collision is detected, while the LDA control is being executed. Whereas, in the first modified embodiment, the SC damage mitigation control is carried out when the low impact collision is detected not only in the period in which the LDA control is being executed but also in a period within a predetermined time from a timing at which the LDA control is finished. FIG. 4 shows a part of the routine that this first modified embodiment executes, the part including a determination process of step S15 that is inserted into the routine shown in FIG. 3. Namely, FIG. 4 shows a modified part of (added part to) the SC damage mitigation control routine shown in FIG. 3. The first modified embodiment executes the process of step S15 in addition to the SC damage mitigation control routine shown in FIG. 3.

More specifically, when the SCDMC section 13 determines that the LDA control is not being executed (S11: No), it proceeds to step S15 so as to determine whether or not an elapsed time from a time point at which the LDA control is(was) finished is shorter than or equal to a set time (referred to as a first set time, t1 seconds). In other words, the SCDMC section 13 determines whether or not the present time point is within the set time (t1 seconds) from the end timing of the LDA control. For example, the SCDMC section 13 includes a timer that measures the elapsed time from the time point at which the LDA control is finished, and determines whether or not the elapsed time measured by the timer is shorter than or equal to the set time (t1 seconds).

When the LDA had not been executed or when the elapsed time from the time point at which the LDA control was finished is longer than the set time (t1 seconds), the SCDMC section 13 makes a "No" determination and goes back to step S11.

In contrast, when the elapsed time from the time point at which the LDA control was finished is shorter than or equal to the set time (t1 seconds), the SCDMC section 13 proceeds to step S12 so as to determine whether or not the low impact collision has occurred. When the SCDMC section 13 determines that the low impact collision has not occurred (S12: No), it goes back to step S11.

When the SCDMC section 13 determines that the low impact collision has occurred (S12: Yes) while the LDA control is being executed or when the elapsed time from the time point at which the LDA control was finished is shorter than or equal to the set time (t1 seconds), the SCDMC section 13 proceeds to step S13 so as to execute the SC damage mitigation control.

According to the first modified embodiment, the SC damage mitigation control is carried out when it is determined that the low impact collision has occurred, while the LDA control is being executed or when the elapsed time from the time point at which the LDA control was finished is shorter than or equal to the set time (t1).

For example, in the case where the LDA control is being executed, a lateral (road width direction) position of the host vehicle with respect to the traveling lane is changed. Thus, immediately after the LDA control is finished, there may remain a relatively high possibility that the host vehicle collides with an other vehicle. Therefore, it is preferable that the SC damage mitigation control be performed for not only a collision that causes the air bag(s) to be inflated but also for the low impact collision that does not cause the air bag(s) to be inflated in such a case.

In view of the above, the first modified embodiment performs the SC damage mitigation control when it is determined that the low impact collision has occurred, not only in the case where the LDA control is being executed but also in the case where the elapsed time from the time point at which the LDA control was finished is shorter than or equal to the set time (t1 seconds). Accordingly, chances to appropriately execute the SC damage mitigation control can be increased.

Second Modified Embodiment

In the present embodiment described above, the SC damage mitigation control is carried out when the low impact collision is detected while the LDA control is being executed. Whereas, in the second modified embodiment, the SC damage mitigation control is carried out when the LDA control starts to be executed within a set time after the low impact collision was detected. In this case, a first half of the processes (i.e., the processes of step S11 and S12 shown in FIG. 3) may be replaced with processes of step S12, S16, and S11 shown in FIG. 5. The second modified embodiment executes a second half of the processes of the SC damage mitigation control routine shown in FIG. 3 similarly to the above embodiment. Namely, the second modified embodiment executes the processes of step S13 and step S14 shown in FIG. 3 as the processes of the second half of the SC damage mitigation control routine.

Figure 5:
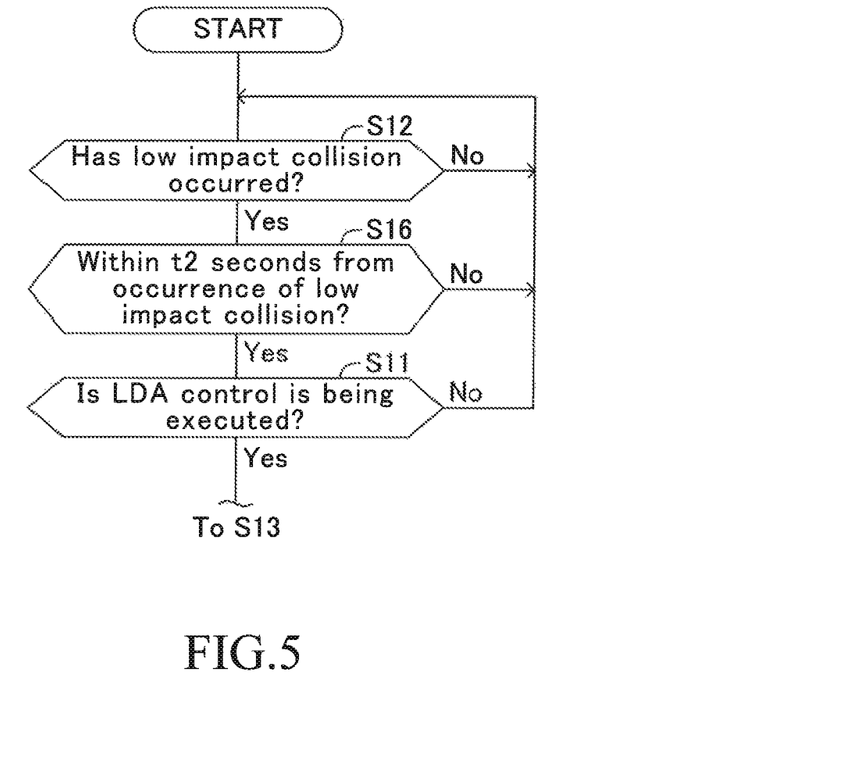
FIG. 5 is a part of a flowchart representing a secondary collision damage mitigation control routine of a second modified embodiment.

As shown in FIG. 5, the SCDMC section 13 of the second modified embodiment firstly determines whether or not the low impact collision has occurred at step S12 after it starts the SC damage mitigation control routine. The SCDMC section 13 repeats the process of step S12 until it determines that the low impact collision has occurred. When the SCDMC section 13 determines that the low impact collision has occurred (S12: Yes), it proceeds to step S16 so as to determine whether or not an elapsed time from a time point at which it is determined that the low impact collision has occurred is shorter than or equal to the set time (referred to as a second set time, t2 seconds). In other words, the SCDMC section 13 determines whether or not the present time point is within the set time (t2 seconds) from the timing of the occurrence of the low impact collision. For example, the SCDMC section 13 includes a timer that measures the elapsed time from the time point at which it is determined that the low impact collision has occurred (namely, the timing at which it received the low impact collision detection signal), and determines whether or not the elapsed time measured by the timer is shorter than or equal to the set time (t2 seconds).

The SCDMC section 13 makes a "Yes" determination until the set time (t2 seconds) elapses since the time point at which it was determined that the low impact collision had occurred. Thus, the SCDMC section 13 proceeds to step S11 so as to determine whether or not the LDA control is being executed. At this step S11, the SCDMC section 13 determines whether or not the LDA control executing signal is supplied.

When LDA control is being executed (S11: Yes), the SCDMC section 13 proceeds to step S13 so as to perform the SC damage mitigation control. For example, the LDA control has already being started when it is determined that the low impact collision has occurred (namely, when the low impact collision is determined to have occurred while the LDA control is being executed), the SC damage mitigation control is carried out.

In contrast, if the LDA control is not being executed (S11: No), the SCDMC section 13 goes back to step S12 (or more preferably to step S16) to execute the above described processes.

Whereas, if the LDA control is started within the set time (t2 seconds) from the time point at which it was determined that the low impact collision had occurred, the SCDMC section 13 makes a "Yes" determination at step S11 so as to perform the SC damage mitigation control (S13). On the other hand, if the elapsed time form the time point at which it was determined that the low impact collision had occurred is longer than the set time (t2 seconds) (S16: No), the SCDMC section 13 goes back to step S12. Thus, in this case, the SC damage mitigation control is not carried out.

In this manner, according to the second modified embodiment, when it is determined that the low impact collision has occurred not only in the period in which the LDA is being executed but also in the period that is within the set time (t2 seconds) before the start of the LDA control, the SC damage mitigation control is carried out.

For example, there may be a case where the host vehicle comes closer to one of the white lines of the traveling lane, and thus, the LDA control is started after the low impact collision has occurred. In this case, it is considered that the driver is unlikely to perform the appropriate operation to avoid the secondary collision or to mitigate the secondary collision damage. Therefore, in such a case, it is preferable that the SC damage mitigation control be performed for not only the collision that causes the air bag(s) to be inflated but also for the low impact collision that does not cause the air bag(s) to be inflated.

In view of the above, the second modified embodiment performs the SC damage mitigation control when it is determined that the low impact collision has occurred in the period where the LDA control is being executed. In addition, the second modified embodiment performs the SC damage mitigation control when the LDA controls starts to be executed within the set time (t2 seconds) after it was determined that the low impact collision had occurred. Accordingly, chances to appropriately execute the SC damage mitigation control can be increased.

Third Modified Embodiment

In the present embodiment and the first and second modified embodiments, the SC damage mitigation control performed at step S13 is the control to generate the brake force and impose the limit on the drive force (e.g., the drive force is set to zero), so as to decelerate the host vehicle at the request deceleration. However, the SC damage mitigation control may be a control only to impose the limit on the drive force without generating the brake force, so as to mitigate the secondary collision damage. For example, at step S13, the SCDMC section 13 transmits the SC damage mitigation control instruction to the engine ECU 50, but does not transmit the SC damage mitigation control instruction to the brake ECU 40. While the engine ECU 50 is receiving the SC damage mitigation control instruction, the engine ECU 50 sets the target torque to a torque obtained by imposing a predetermined SC damage mitigation upper limit torque on the driver requiring torque, and controls the engine actuator 51 in such a manner that the torque generated by the engine 52 coincides with the target torque. Note that, in this case, the predetermined SC damage mitigation upper limit torque may be zero.

Fourth Modified Embodiment

For example, in a case where an inter-vehicle distance between the host vehicle and a following vehicle that follows the host vehicle is short, when the brake force is generated by the SC damage mitigation control, the following vehicle may excessively approach the host vehicle.

In view of this, the fourth modified embodiment carries out the SC damage mitigation control so as to:
generate the brake force applied to the host vehicle (with or without suppressing the drive force applied to the host vehicle) when the following vehicle is not detected in a proximity area that is an area near the host vehicle; and
suppress the drive force applied to the host vehicle without generating the brake force applied to the host vehicle when the following vehicle is detected in the proximity area.

This driving assistance apparatus according to the fourth modified embodiment further comprises a rear direction monitoring sensor 100, as shown by a broken line in FIG. 1. The rear direction monitoring sensor 100 is a sensor to detect an object that is present in the rear area of the host vehicle, and may be a camera sensor and/or a radar sensor. Specifically, the driving assistance apparatus according to the fourth modified embodiment comprises both of the camera sensor and the radar sensor, as the rear direction monitoring sensor 100. The driving assistance apparatus synthesizes information supplied by the both sensors so as to recognize/detect the object (hereinafter, referred to as a target object) that is present in the rear area of the host vehicle. The rear direction monitoring sensor 100 obtains information on a type of the target object, a distance between the target object and the host vehicle, a relative speed between the target object and the host vehicle, a direction of the target object with respect to the host vehicle, or the like, and transmits the information to the CAN 80 so that the driving assist ECU 10 of the fourth modified embodiment can obtain information on the target object (i.e., the following vehicle).

Figure 6:
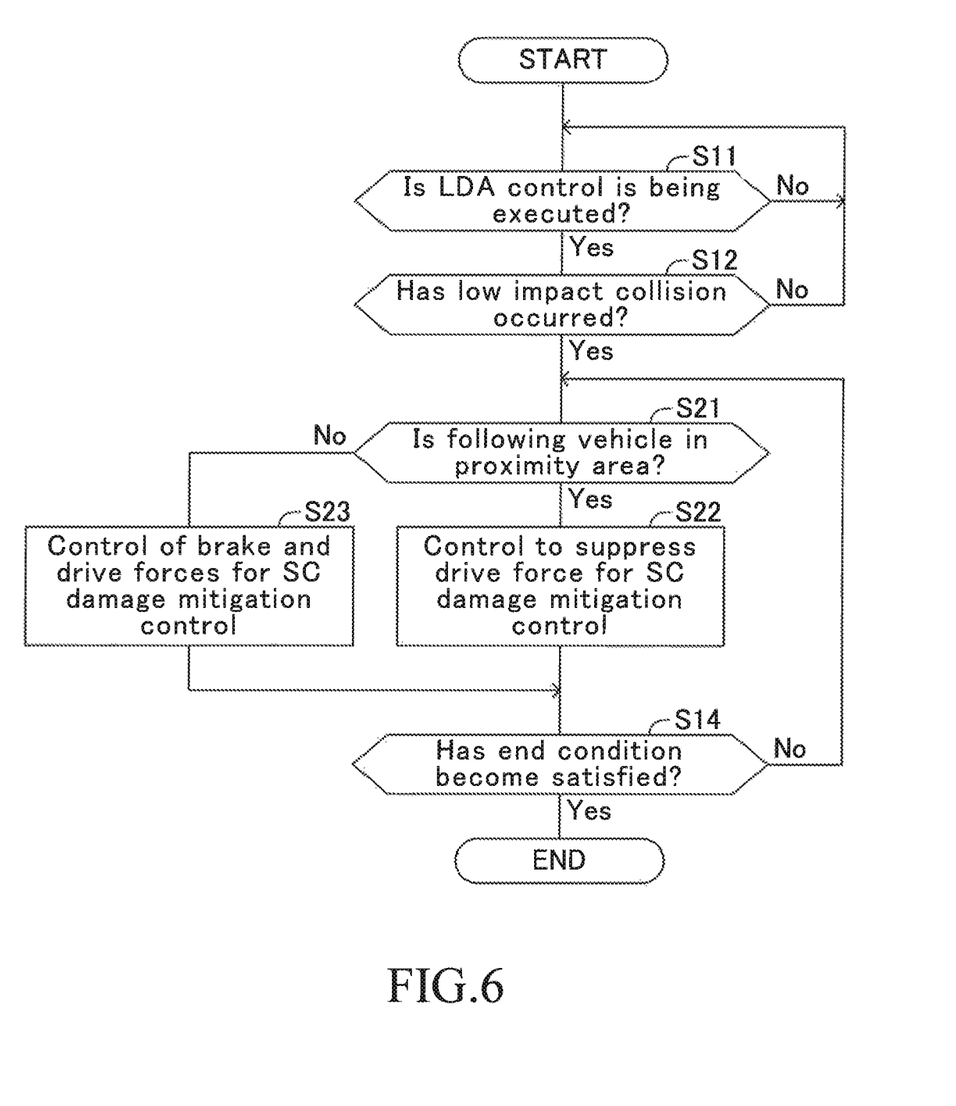
FIG. 6 is a part of a flowchart representing a secondary collision damage mitigation control routine of a fourth modified embodiment.

FIG. 6 shows an SC damage mitigation control routine for the fourth modified embodiment. This routine shown in FIG. 6 is different from the routine shown in FIG. 3 that the above embodiment executes only in that step S13 of FIG. 3 is replaces by Step S21 to step S23. The other processes (S11 to S12, S14) are the same as those shown in FIG. 3. Hereinafter, the differences between FIG. 3 and FIG. 6 will be mainly described.

The SCDMC section 13 of the fourth modified embodiment proceeds to step S21 when it determines that the low impact collision has occurred (S12: Yes). At step S21, the SCDMC section 13 determines whether or not the following vehicle is present in the proximity area, based on the information supplied from the rear direction monitoring sensor 100. The proximity area is, for example, an area within a set distance from the host vehicle in the rear direction. In other words, if the following vehicle is present in the proximity area, the inter-vehicle distance between the following vehicle and the host vehicle is equal to or shorter than the set distance. If the inter-vehicle distance between the following vehicle and the host vehicle is longer than the set distance, the following vehicle does not excessively come close to the host vehicle even when the SC damage mitigation control generates the brake force applied to the host vehicle. For example, the set distance may preferably be set to a distance which is longer as the vehicle speed detected by the vehicle speed sensor is higher.

When the SCDMC section 13 determines that the following vehicle is present in the proximity area (S21: Yes), the SCDMC section 13 performs the SC damage mitigation control so as to suppress the drive force applied to the host vehicle without generating the brake force applied to the host vehicle at step S22. In this case, the SCDMC section 13 transmits the SC damage mitigation control instruction for suppressing (imposing a limitation on) the torque generated by the engine 52 to the engine ECU 50, but does not transmit the SC damage mitigation control instruction to the brake ECU 40.

In contrast, when the SCDMC section 13 determines that the following vehicle is not present in the proximity area (S21: No), the SCDMC section 13 proceeds to step S 23. At step S23, the SCDMC section 13 performs the SC damage mitigation control so as to transmit the SC damage mitigation control instruction for generating the brake force to the brake ECU 40 and transmit the SC damage mitigation control instruction for suppressing (imposing a limitation on) the torque generated by the engine 52 to the engine ECU 50. The process of step S23 is the same as that of step S13 that the above described embodiment executes.

The SCDMC section 13 proceeds to step S14, after it execute the process of step S22 or of step S23. At step S14, the SCDMC section 13 determines whether or not the end condition of the SC damage mitigation control becomes satisfied. The SCDMC section 13 executes the SC damage mitigation control in the above manner until it determines that the end condition of the SC damage mitigation control becomes satisfied.

In this manner, the fourth modified embodiment can prevent the following vehicle from approaching the host vehicle too closely even when the SC damage mitigation control is performed. The fourth modified embodiment can be applied to the first and second modified embodiments.

The driving assistance apparatuses according to the present embodiment and the modified embodiments have been described. It should be noted that the present disclosure should not limited to the above apparatuses, and may be modified unless the modifications depart from the scope of the present disclosure.

For example, the SCDMC section 13 may be configured to start performing the SC damage mitigation control in any of the following cases.

A case where it is determined that the low impact collision has occurred in the period in which the LDA control is being executed.

A case where it is determined that the low impact collision has occurred in the period from the time point at which the LDA control is finished to the time point at which the set time (t1 seconds) elapses from the time point at which the LDA control is finished.

A case where the LDA control starts to be executed in the period from the time point at which it was determined that the low impact collision had occurred to the time point at which the set time (t2 seconds) elapses since the time point at which it was determined that the low impact collision had occurred.

For example, a selection switch configured to be operated by the user may be provided. The user may operate the switch to allow the SC damage mitigation control routine to be executed and to prohibit the SC damage mitigation control routine from being executed.

For example, in the above embodiments, the low impact collision determination condition is determined to become satisfied when both of the determination conditions B1 and B2 are satisfied. However, the low impact collision determination condition may be determined to become satisfied when only either one of the determination conditions B1 and B2 is satisfied.

What is claimed is:

1. A driving assistance apparatus comprising:
   a brake device including a brake actuator that causes a friction brake mechanism to apply a brake force to a host vehicle;
   a drive force generating device that generates a drive force applied to said host vehicle; and
   a control unit storing executable program instructions that when executed cause the control unit to:
   perform a lane departure suppression control so as to prevent said host vehicle from departing from a traveling lane, by giving an alert to a driver of said host vehicle or executing a steering control, when said host vehicle is determined to be about to depart from said traveling lane;
   obtain a collision indicative value indicative of an impact caused by a collision of said host vehicle with an object;
   determine that a low impact collision has occurred if the collision does not cause an air bag of said vehicle to be inflated and if said collision indicative value exceeds a threshold;
   determine whether or not a low impact collision time point at which said low impact collision is determined to have occurred is in a first period that contains a duration in which said alert to said driver of said host vehicle is being given by said lane departure suppression control or said steering control is being executed by said lane departure suppression control; and
   perform a secondary collision damage mitigation control to let said brake device apply said brake force to said host vehicle or impose a limitation on said drive force generated by said drive force generating device, when it is determined that said low impact collision time point is in said first period; wherein said control unit is configured not to perform said secondary collision damage mitigation control, when it is determined that said low impact collision time point is not in said first period.

2. The driving assistance apparatus according to claim 1, wherein,
   said control unit further stores executable program instructions that when executed cause the control unit to perform said secondary collision damage mitigation control, when said low impact collision is determined to have occurred in said first period that is a period in which said alert to said driver of said host vehicle is being given by said lane departure suppression control or said steering control is being executed by said lane departure suppression control.

3. The driving assistance apparatus according to claim 1, wherein, said control unit further stores executable program instructions that when executed cause the control unit to perform said secondary collision damage mitigation control, when said low impact collision is determined to have occurred in said first period that includes a period from an end time point at which said lane departure suppression control is finished to a time point at which a first set time elapses from said end time point.

4. The driving assistance apparatus according to claim 1, wherein, said control unit further stores executable program instructions that when executed cause the control unit to perform said secondary collision damage mitigation control, when said lane departure suppression control starts to be performed in said first period that includes a period from a start time point at which said low impact collision is determined to have occurred to a time point at which a second time elapses from said start time point.

5. The driving assistance apparatus according to claim 1, further comprising a rear direction monitoring sensor configured to detect a following vehicle that follows said host vehicle in a rear area of the host vehicle, wherein, said control unit further stores executable program instructions that when executed cause the control unit to:

perform said secondary collision damage mitigation control by letting said brake device apply said brake force to the host vehicle when said following vehicle is not detected in a predetermined proximity area of said host vehicle; and perform said secondary collision damage mitigation control by imposing a limitation on said drive force without letting said brake device apply said brake force to said host vehicle, when said following vehicle is detected in said predetermined proximity area of said host vehicle.

\* \* \* \* \*